United States Patent [19]

Carpenter et al.

[11] Patent Number: 4,967,839

[45] Date of Patent: Nov. 6, 1990

[54] METHOD AND COMPOSITION FOR CEMENTING IN A WELLBORE

[75] Inventors: Robert B. Carpenter, Hurst; Richard R. Jones, Allen, both of Tex.

[73] Assignee: Atlantic Richfield Company, Los Angeles, Calif.

[21] Appl. No.: 428,356

[22] Filed: Oct. 23, 1989

[51] Int. Cl.$^5$ .............................................. E21B 33/13
[52] U.S. Cl. ...................................... 166/293; 106/665; 166/292
[58] Field of Search ................ 166/292, 293; 405/263, 405/264, 266; 106/89, 90, 97, 314; 523/130

[56] References Cited

U.S. PATENT DOCUMENTS

| | | | |
|---|---|---|---|
| Re. 29,595 | 3/1978 | Adams et al. | 166/293 X |
| 2,252,271 | 8/1941 | Mathis . | |
| 2,294,294 | 8/1942 | Grebe . | |
| 2,819,239 | 1/1958 | Eberhard et al. . | |
| 3,409,080 | 11/1968 | Harrison . | |
| 3,421,584 | 1/1969 | Eilers-Parks . | |
| 3,491,049 | 1/1970 | Gibson et al. | 106/90 |
| 3,511,314 | 5/1970 | Scott et al. | 166/293 |
| 3,605,897 | 9/1971 | Crinkelmeyer et al. | 166/291 |
| 3,645,763 | 2/1972 | Ronzio et al. | 106/90 |
| 3,915,919 | 10/1975 | Nishioka et al. | 106/90 |
| 3,952,805 | 4/1976 | Persinski et al. | 166/293 |
| 4,119,597 | 10/1978 | Enoue | 106/90 |
| 4,258,790 | 3/1981 | Hale | 166/293 |
| 4,462,837 | 7/1984 | Baker et al. | 166/293 |
| 4,569,395 | 2/1986 | Carpenter | 166/293 |
| 4,622,353 | 11/1986 | Weiss | 106/90 X |
| 4,797,159 | 1/1989 | Spangle | 166/292 X |

OTHER PUBLICATIONS

Smith, Dwight K., *Cementing*, Society of Petroleum Engineers, Revised Edition 1987, pp. 7–10, 18, 36 and 40.

*Primary Examiner*—George A. Suchfield
*Attorney, Agent, or Firm*—James C. Fails; Arthur F. Zobal; Geoffrey A. Mantooth

[57] ABSTRACT

A method of cementing in a wellbore penetrating subterranean formations characterized by mixing a predetermined quantity of Portland Cement containing at least 2 percent by weight of tricalcium aluminate; at least 2 percent by weight of gypsum; and 0.3–2.0 percent by weight of polyvinyl alcohol with enough water to form a pumpable slurry; pumping the slurry to a desired location in the wellbore and allowing the slurry to harden to a solid mass. Also disclosed is the composition. These methods and composition provide a cementing that has many advantages and beneficial results as delineated in the specification.

4 Claims, No Drawings

METHOD AND COMPOSITION FOR CEMENTING IN A WELLBORE

FIELD OF THE INVENTION

This invention relates generally to well cementing composition and methods. Particularly, this invention relates to cementing in a wellbore penetrating subterranean formations wherein the cement provides improved bonding, more resistance to shattering under the impact of later operations and other significant advantages delineated hereinafter.

DESCRIPTION OF THE PRIOR ART

Cement compositions and methods are employed in oil and gas wells for cementing in a wellbore penetrating subterranean formations. Typically cement slurries are pumped down the inside of a casing and back up the outside of the casing through the annular space. The slurry is allowed to set up or harden in the annular space thereby forming a rigid column which ideally forms a bond with the earth formations as well as the metal pipe. To achieve a satisfactory primary cementing job, it is important to achieve a tight bond so as to provide zonal isolation, preventing a vertical communication of fluids or gas along or within the cement column or otherwise preventing communication through the column.

While these job criteria may be adequately achieved using conventional cementing compositions in typical subterranean formations under normal well conditions, conventional systems often do not fulfill these requirements; particularly, when applied across non-stable or high permeability subterranean formations and/or when other well conditions present difficult cementing conditions. Conventional cementing compositions generally experience a volumetric shrinkage upon set which is detrimental to zonal isolation and bond strength/integrity.

To improve cementing success against a broad range of adverse well conditions one or more of the following special properties are desirable in addition to the aforementioned capabilities of conventional cementing compositions:

1. The cement should provide a stable rheological yield point (yp) throughout its anticipated temperature range to ensure slurry uniformity and displacement efficiency.

2. The cement should not allow free water or slurry sedimentation over a desirable range of slurry densities and should completely fill the annular space and the column uniformly.

3. The cement slurry should exhibit thixotropic, or viscoelastic properties, thereby preventing or reducing fallback and loss of cement slurry to weak or vugular formations. These same properties contribute to excellent squeeze cementing results.

4. The cement slurry should have a shorter set transition time than conventional cement slurries so that it will set fast to control fallback and minimize fluid/gas invasion of the cement.

5. The cement should have consistent fluid loss control below 100 cubic centimeters (cc's) when tested in accordance with those procedures set forth in the American Petroleum Institute (API), Spec 10. This allows the cement slurry to maintain its properties in the hole under all downhole conditions, without requiring a fluid loss additive, per se.

6. The cement slurry should have fast development of compressive strength to reach at least 500 pounds per square inch (psi) in a shorter time frame than a conventional composition with a similar or longer thickening-/pumping time. This minimizes waiting on cement time and avoidable delays in future drilling operations at increased costs and the potential for an influx of downhole fluids or gases.

7. The cement slurry should provide adhesive and cohesive bonding strength that is surprisingly superior to conventional cement.

8. The cement slurry should also have a positive volumetric expansion after initial set to provide a more competent annular seal and greater bond strength.

9. The cement slurry should alleviate problems with fluid and gas migration by having anti-fluid and anti-gas migration characteristics so as to prevent development of flow channels in the cemented annulus.

10. The set cement slurry should provide greater resistance to dissolution, erosion and corrosion by acids, gases and other corrosive or reactive agents and, in turn, will help to contain stimulation treatments and prevent lost reserves due to induced damage to cement column.

11. The cement slurry should set to a cement that has increased elasticity to minimize cement shattering during drilling or perforating.

In an earlier U.S. Pat. No. 4,569,395, entitled "MATRIX CONTROL CEMENTING SLURRY" by Bob Carpenter, one of the co-inventors herein, the problem of fluid loss control was discussed, and any material in that patent that is not incorporated herein by inference at least, is incorporated by reference.

The closest prior art of which the inventors are aware is U.S. Pat. No. 4,569,395. This patent describes hydrolyzing and solubilizing polyvinyl acetate that is originally insoluble and then allowing the hydrolysis product, polyvinyl alcohol hydroxide to solubilize under the thermal effects to reduce thinning. Specifically, that patent describes at column 4, line 8 et seq. the use of about 95 percent acetate groups converted to hydroxyl groups to be substantially insoluble in the low temperature cement slurry initially but being heat actuable at formation temperatures and begin to solubilize and reduce fluid loss. In contrast, in this invention immediate solubility at low temperature (e.g. below 140 degrees Fahrenheit) is sought. To obtain the result desired herein, hydrolysis below 92 percent, preferably 87–89 percent, is employed herein.

Cited against that patent were the following patents which have been ordered and are abstracted herein to assist the reader.

U.S. Pat. No. 2,252,271 describes plugging with polyvinyl alcohol to stop one or more leaks in tanks or the like. It polymerizes with the catalyst like benzoyl peroxide (actually forming a copolymer with diocarboxylic acid and polyhydric alcohol).

U.S. Pat. No. 2,294,294 describes injecting a resin that will polymerize in-situ to seal around the casing with an acid resistant, bonding material (polystyrene hexachlordiphenyloxide for example).

U.S. Pat. No. 2,819,239 describes Portland cement employing vinylidene chloride with acrylonitrile in proportions of 70 to 97 percent by weight vinylidene chloride and vinyl chloride and 95 to 5 percent of vinylidene chloride. The mixture is used for cementing in a well penetrating subterranean formation.

U.S. Pat. No. 3,409,080 describes an aqueous cement slurry that includes O,O-alkylene-O'O'-alkylene pyrophosphate and urea.

U.S. Pat. No. 3,421,584 describes sealing voids with an aqueous solution of a water soluble polymer and a cross linking agent for polymerization, and sodium silicate. The liquid is flowed into the voids and then let set up. It describes using a polymer having a molecular weight of ten thousand to ten million.

U.S. Pat. No. 3,491,049 describes a fluid loss cement agent that includes, as a fluid loss agent, polyamine, polyalkylene, polyimine and mixtures thereof. Cement slurry is injected with these ingredients and then allowed to set up.

U.S. Pat. No. 3,511,314 describes an aqueous cement slurry that comprises cement; water reaction product, a fluid loss agent like polyalkylene polyamine and a mixture that includes a sulfate.

U.S. Pat. No. 3,605,897 describes as a fluid loss agent for glycol, polyvinyl alcohol-polyvinyl acetate and silica flour. It cites U.S. Pat. No. 2,739,735 to prevent glycol loss which is a problem solved. It also cites polyvinyl alcohol polyvinyl acetate perforations in the art, including prior art patents at column 2, line 36 et seq.

U.S. Pat. No. 3,645,763 describes ¾ percent to 5 percent polyvinyl alcohol added to cement with a high molecular weight, low solubility barium hydroxide or barium oxide. This lessens or eliminates the fluorescence in cement. It can be added to add color to concrete products such as patio tile and the like.

U.S. Pat. No. 3,915,919 describes gypsum, polyvinyl alcohol and a metallic product that provides an excellent compound in water for making concrete products such as patio statues or the like.

U.S. Pat. No. 4,119,597 describes a cement additive that includes polyvinyl alcohol with either aluminum sulfate or lime and an aqueous dispersoid of vegetable oil or fat.

U.S. Pat. No. 4,258,790 shows a fluid loss additive for well cements in which polyvinylpyrrolidone, carboxymethyl hydroxyethyl cellulous and sodium naphthalene sulfonate are employed.

U.S. Pat. No. 4,462,837 describes a cement with hydroxyethylcellulose ether of a critical viscosity or a mixture of hyroxyethylcellulose ether and hydroxypropylcellulose ether of critical viscosity plus a dispersant.

SUMMARY OF INVENTION

Accordingly it is an object of this invention to provide one or more of the advantageous features delineated as desirable and not heretofore provided in the prior art.

It is a specific object for this invention to provide a cement slurry that will set to a cement that provides all of the advantages delineated hereinbefore as desirable features and not heretofore provided.

These and other objects will become apparent from the descriptive matter hereinafter.

In accordance with one aspect of this invention, there is provided a method of cementing in a wellbore penetrating subterranean formations characterized by the steps of mixing a predetermined quantity of Portland cement containing at least 2 percent by weight of tricalcium aluminate; at least 2 percent by weight of the predetermined quantity of Portland cement of gypsum; and 0.3–2.0 percent by weight of said predetermined portion of Portland cement of polyvinyl alcohol that is formed by 92 percent or less hydrolysis of acetate moieties of polyvinyl acetate to polyvinyl alcohol; and sufficient water (without requiring a fluid loss additive, per se) to form a pumpable cement slurry that can be pumped to a desired location in the wellbore and allowed to harden to a solid mass in situ.

In another embodiment of this invention there is provided a cement composition that can be employed to form a slurry that can be pumped to a desired location in a wellbore before being allowed to harden into a solid mass comprising a quantity of Portland cement containing at least 2 percent by weight of tricalcium aluminate; at least 2 percent by weight of the predetermined quantity of Portland cement of gypsum; 0.3–2.0 percent by weight of said predetermined Portland cement of polyvinyl alcohol that is formed by at least 92 percent or less hydrolysis of the moieties of polyvinyl acetate to polyvinyl alcohol; and sufficient water without a fluid loss additive to form a pumpable slurry that can be pumped to a desired position in a wellbore and allowed to set in situ.

DESCRIPTION OF PREFERRED EMBODIMENTS

Applicants are knowledgeable in the science of cementing. They have been called in to attempt to fix problems encountered in various areas of the world. A particular problem is production zones that are separated by only small barriers; such as, 2 to 3 feet of shale or weak bedding planes. These particularly can occur in shallow laminate formations, or in areas having a bottom hole static temperature of about 180 degrees Fahrenheit, or lower. Due to differential pressure across weak barriers, fluid or gas migration will occur if a competent cement sheath is not applied. For the cement designs to be successful they must exhibit short transition periods; provide a positive seal between the casing and formation; inhibit fluid migration through the cement matrix and have a rapid compressive strength development. This disclosure describes a cement composition that can be made into a slurry to provide these properties. In particular, a thixotropic/expanding cement system would be beneficial in producing slurry with reduced density and self-supporting properties so as to lower the hydrostatic pressure on the formation during and after cement placement; regulate leak off and potential lost circulation problems in the well; and provide volumetric expansion for complete annular fill and positive seal.

The well cementing compositions and the method of this invention make use of water, hydraulic cement and advantageous additives.

The water can be any of the conventionally employed waters formaking oil cement for use in a well penetrating subterranean formation. This is well understood and should not include aqueous solutions of reactants that will adversely affect the properties of the cement.

The term "hydraulic cement" encompasses any inorganic cement which hardens or sets under water, although for practical purposes this means Portland cement, which is commercially available. It is an aluminous and pozzolan cement. In this invention, Portland cements are chosen which have at least 2 percent by weight of tricalcium aluminate (C3A) to obtain vital expansion; and, preferably 3–6 percent by weight of tricalcium aluminate. This provides the desired thixotropy and expansion after set. Actually the more tricalcium aluminate that is present, the greater will be the after set expansion of the cement composition. The preferred classes of Portland cement are any of the Class A, B, C, G and H types of cement listed in API Spec 10, as long as the C3A content is greater than 3 percent. Strength enhancers, such as silica flour, can also be employed; although, they are not necessary. Fluid loss additives are sometimes added in a tradeoff, and reduce the fluid loss and damage to the formation. The tradeoff involves the lengthening of the time to set cement. Expressed otherwise, most fluid loss additives are cellulose/dispersant blends which also act as retarders for this cement so they increase the thickening time with the undesirable results attendant to this prior art. Frequently, inorganic salts have been employed to reduce formation damage and cement transition time. One of the advantages of this invention is that almost anything employed in the prior art; e.g. set accelerators, retarders and fluid loss additives; can be employed herein without adversely affecting the set cement to an unacceptable degree.

Specifically, the present cement composition includes at least 2 percent by weight of the cement of gypsum and preferably gypsum is present in a proportion of 2 percent to 12 percent by weight of the Portland cement (including the C3A). The gypsum included effects a cement that tends to expand slightly after initial set and improves the bonding of inorganic constituents of the cement. The gypsum also imparts thixotropic or viscoelastic characteristics to the resultant cement composition.

The cement composition includes at least 0.3 and up to about 2.0 percent by weight of polyvinyl alcohol. Preferably a proportion of about 0.6 to 1.5 percent of polyvinyl alcohol based on the weight of the dry Portland cement is employed in this invention.

Methods of producing polyvinyl acetate/polyvinyl alcohol polymers are known commercially. U.S. Pat. Nos. 1,676,156, 1,971,951, and 2,109,883; as well as various literature references; describe these types of polymers and their preparation. Among the literature references are "Vinyl Polymerization", volume 1, part 1, by Ham composed by Marsell Dekker, Inc., (1967) and "Preparative Methods of Polymer Chemistry", by Sorenson and Campbell, published by Interscience Publishers, Inc., New York (1961).

In general polyvinyl acetate in an alcohol solution can be converted to polyvinyl alcohol by replacement of the acetate groups by the hydroxyl groups. This is referred to as "alcoholysis", or broadly "hydrolysis". The ratio of the polyvinyl acetate to polyvinyl alcohol moieties depend upon the extent to which the acetate groups have been treated by hydrolysis during the polymerization. The extent of hydrolysis can range from as low as 1 percent up to 100 percent where substantially all of the acetate groups have been converted to hydroxyl groups.

Polyvinyl acetate—polyvinyl alcohol lattices commercially available are usually described as partially, intermediately, fully, and superhydrolyzed, depending upon the percent of hydrolysis achieved during the polymerization and the molecular weight of the resulting polymer. Generally speaking the higher the degree of hydrolysis and the higher the molecular weight the lower the water solubility of the polymer. Partially hydrolyzed polymers are from 87 to 89 percent hydrolyzed; intermediately hydrolyzed polymers are from 95.5–96.5 percent hydrolyzed; fully hydrolyzed polymers are from 98.0–98.8 percent hydrolyzed and super hydrolyzed polymers are from 99.7 to 100 percent hydrolyzed. In similar fashion the molecular weight of the resulting polymer ranges from about 22,000 to 31,000 for the partially hydrolyzed polymers, 77,000 to 79,000 for the intermediately hydrolyzed polymers, 80,000 to 120,000 for the fully hydrolyzed polymers and greater than 110,000 to 120,000 for the super hydrolyzed polymers. For purposes of the present invention, polyvinyl acetate—polyvinyl alcohol polymers must have a hydrolysis of less than 92 percent or more preferably 87–89 percent hydrolyzed. Thus the molecular weight is less than 75,000 or more preferably from about 22,000 to about 31,000. The use of partially hydrolyzed polymers preferably of fine particle size insures the solubility of the polymer in the cement slurry at ambient temperatures. These more preferred polymers are commercially available from Air Products, Dallas, Texas as trademarked products; for example, Air Products 205, 205S, 523, 523S, 540 and 540S.

Mixing water with cement to form a pumpable slurry is well known. The amount of water used can vary over a wide range depending upon the consistency of the slurry required, the strengths requirement for the particular job and other factors. API Spec 10, which is known in the cement industry, describes an apparatus and method for measuring the consistency of the cement slurries in terms of Bearden units of consistency (Bc). A pumpable slurry should be in the range of about 5–25 Bc and preferably in the range of 7–15 Bc. Slurries thinner than 5 Bc would have a tendency to have greater particles settling and free water generation. Slurries thicker than 15 Bc become increasingly difficult to pump.

Depending upon the particular slurry and intended conditions of use, mixing water is utilized in the slurry of the present invention in the range about 30 to 130 percent by weight based on the weight of the dry cement and preferably in the range of 40 to 100 percent by weight.

Another advantage of this invention is that the cement does not require a fluid loss control agent to be added. As a consequence of this, additional polymer costs and the problems associated with increased cement retardation and viscosity can be alleviated.

EXAMPLES

The examples herein represent actual field tests carried out by cementing in a well penetrating subterranean formations.

EXAMPLE I

In this example, the well was drilled to 3502 feet with the bottom hole circulating temperature calculated to be 105 degrees F. At 8:55 a.m., the cement additive and water were batch mixed, employing a commercially available Batch blender trailer unit. There was no evidence of foaming or entrained air. The Portland cement contained greater than 2 percent by weight of tricalcium aluminate. About 3.0 percent of gypsum was employed based on the weight of the cement. A proportion of about 0.6 percent of polyvinyl alcohol was employed. The polyvinyl alcohol was partially hydrolyzed. The density of the cement system was measured at 15.7 pounds per gallon (PPG). Three barrels of cement slurry were displaced into the well using potassium chloride water solution as a displacing fluid at an average rate of about one barrel per minute and pressure of about 200 psi. The tubing was pulled up to 3200 feet after cement was spotted across the perforations from 3200–3300 feet to completely clear the perforations and expose the top of the liner. This allowed squeeze coverage of all potential leak areas. During this process ¾ barrel of fluid was lost due to volume expansion inside the wellbore. 1½ to 2 barrels of cement slurry was displaced behind the pipe after only about 40 minutes. At least 500 psi squeeze pressure was placed on the well and locked in. No decline in gauge pressure was observed for 20 minutes to indicate that the application was successful. The job was terminated. It was agreed by those in attendance that the cement could have been drilled out within four hours after job termination, although, in fact, the cement was drilled out the following day, but drilled harder than any previously used cement systems applied under the same conditions.

EXAMPLE II

The cement method and composition described and claimed herein has been employed in at least seven additional wells that were very successful, even more successful than the well described in Example I. The narrow concentrations delineated hereinbefore have been tried and found successful.

Specifically, the latex expanding cement systems, described herein provide an ease of mixing on location and are more cost effective than conventional systems.

This new cement method and composition will greatly enhance the success rate of cementing jobs in east Texas and other fields where the static temperature is less than 170 degrees Fahrenheit and the wells are predisposed or have a history of zonal communication or poor bonding.

Specifically, the cement method and composition in accordance with this invention results in cementing jobs that are highly successful in primary, remedial and/or plugging applications, and have features delineated hereinbefore as desirable and not heretofore provided.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A method of cementing in a wellbore penetrating subterranean formations comprising:
    (a) mixing a predetermined quantity of Portland cement containing at least 2 percent by weight of the predetermined quantity of Portland cement of tricalcium aluminate; at least 2 percent by weight of said predetermined quantity of said Portland cement of gypsum; and 0.3–2.0 percent by weight of said predetermined Portland cement of polyvinyl alcohol that is formed by less than 92 percent hydrolysis of the acetate moieties of polyvinyl acetate to polyvinyl alcohol; and sufficient water to form a pumpable cement slurry; and
    (b) pumping said slurry to a desired location in the wellbore; and allowing said slurry to harden to a solid mass;
    such that there is formed a cement having special properties that provide a stable rheological yield point throughout its anticipated temperature range to ensure slurry uniformity and displacement efficiency; has a consistent fluid loss control below 100 cubic centimeters without requiring a fluid loss additive, per se; provide adhesive and cohesive bonding strength surprisingly superior to conventional cements; alleviate problems with fluid and gas migration; provide resistance to dissolution, erosion and corrosion by gases, acids and other corrosive or reactive agents; and set to a cement that has increased elasticity to minimize cement shattering during drilling and perforating.

2. The method of claim 1 wherein said Portland cement contains 3 percent–6 percent by weight of said tricalcium aluminate.

3. The method of claim 1 wherein a proportion of gypsum in the range of 2 percent–12 percent by weight of said Portland cement is employed.

4. The method of claim 1 wherein said polyvinyl alcohol is employed in amount of about 0.6–1.5 percent by weight of said predetermined quantity of Portland cement.

* * * * *